United States Patent
Yeh et al.

(10) Patent No.: US 12,415,128 B2
(45) Date of Patent: Sep. 16, 2025

(54) FORCE FEEDBACK MODULE

(71) Applicant: Quanta Computer Inc., Taoyuan (TW)

(72) Inventors: Chun-Feng Yeh, Taoyuan (TW); Chun-Lung Chen, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 392 days.

(21) Appl. No.: 18/147,973

(22) Filed: Dec. 29, 2022

(65) Prior Publication Data

US 2024/0115938 A1    Apr. 11, 2024

(30) Foreign Application Priority Data

Sep. 26, 2022   (TW) .................................. 111210472

(51) Int. Cl.
*A63F 13/24*     (2014.01)
*A63F 13/285*    (2014.01)

(52) U.S. Cl.
CPC ............ *A63F 13/285* (2014.09); *A63F 13/24* (2014.09)

(58) Field of Classification Search
CPC ................................ A63F 13/24; A63F 13/285
See application file for complete search history.

(56) References Cited

U.S. PATENT DOCUMENTS

| | | | |
|---|---|---|---|
| 7,061,466 B1 * | 6/2006 | Moore | F16F 15/03 345/161 |
| 2013/0194085 A1 * | 8/2013 | Grant | A63F 13/285 340/407.2 |
| 2018/0345134 A1 * | 12/2018 | Schmitz | G06F 3/016 |
| 2020/0276499 A1 * | 9/2020 | Black | A63F 13/285 |

* cited by examiner

*Primary Examiner* — David L Lewis
*Assistant Examiner* — S. N. H.
(74) *Attorney, Agent, or Firm* — McClure, Qualey & Rodack, LLP

(57) ABSTRACT

A force feedback module is provided. The force feedback module includes a trigger element, an actuating element, and a transmission assembly disposed between the trigger element and the actuating element. The transmission assembly includes a first transmission element. The first transmission element and the trigger element change between a contact state and a non-contact state. When the first transmission element and the trigger element are in the contact state, a driving force generated by the actuating element is transmitted to the trigger element via the transmission assembly to generate force feedback.

17 Claims, 7 Drawing Sheets

FORCE FEEDBACK MODULE

CROSS REFERENCE TO RELATED APPLICATIONS

This application claims the benefit of Taiwan Patent Application No. 111210472, filed on Sep. 26, 2022, the entirety of which is incorporated by reference herein.

BACKGROUND OF THE INVENTION

Field of the Invention

The present invention relates to a force feedback module.

Description of the Related Art

As technology has improved, virtual reality (VR) and augmented reality (AR) have undergone significant development. Nowadays, there is already a wide selection of smart VR wearable devices and smart AR wearable devices. When a user puts on a smart wearable device, he can see a vivid and realistic display. To further enhance user experience in haptic interactions, a handheld controller may be used. Common handheld controllers include handle-type controllers and gun-type controllers, which may have buttons or triggers. Users may interact with the display by pressing the button or pulling the trigger. However, current handheld controllers do not provide immersive force feedback when a user presses the button or pulls the trigger.

BRIEF SUMMARY OF THE INVENTION

A force feedback module is provided in accordance with some embodiments. The force feedback module includes a trigger element, an actuating element, and a transmission assembly disposed between the trigger element and the actuating element. The transmission assembly includes a first transmission element. The first transmission element and the trigger element change between a contact state and a non-contact state. When the first transmission element and the trigger element are in the contact state, a driving force generated by the actuating element is transmitted to the trigger element via the transmission assembly to generate force feedback.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

The following disclosure provides many different embodiments, or examples, for implementing different features of the subject matter provided. Specific examples of components and arrangements are described below to simplify this disclosure. These are, of course, merely examples and are not intended to be limiting. For example, the formation of a first feature "on" and/or "above" a second feature in the description that follows may include embodiments in which the first and second features are formed in direct contact, and may also include embodiments in which additional features may be formed between the first and second features, so that the first and second features may not be in direct contact. The spatially relative terms are intended to encompass different orientations of the device in use or operation in addition to the orientation depicted in figures. The apparatus may be otherwise oriented (rotated 90 degrees or at other orientations), and the spatially relative descriptors used herein may likewise be interpreted accordingly.

In this specification, the words "including", "comprising", "having", and the like are open words, so they should be interpreted as meaning "including but not limited to . . . ". Therefore, when the words "including", "comprising", "having", and the like are used in the description of this disclosure, the presence of corresponding features, regions, steps, operations and/or components is specified, and without excluding the presence of one or more other features, regions, steps, operations and/or components. In addition, in this specification, words "about" or "substantially" are generally interpreted as within 10%, 5%, 3%, 2%, 1%, or 0.5% of a given value or range.

Figure 1:
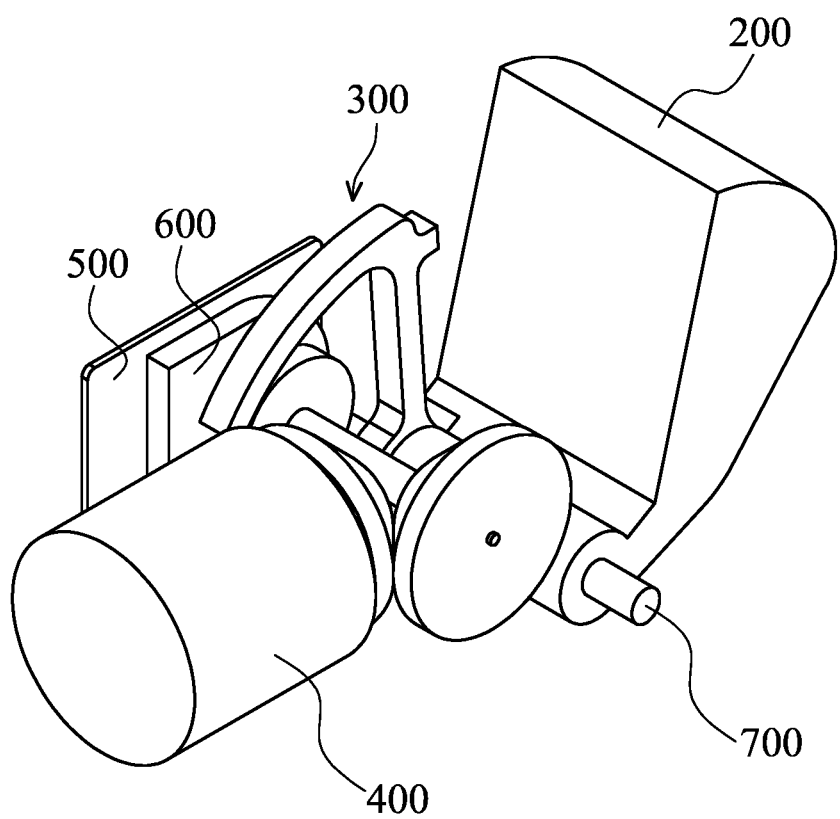
FIG. 1 is a perspective view of the force feedback module.
Figure 2:
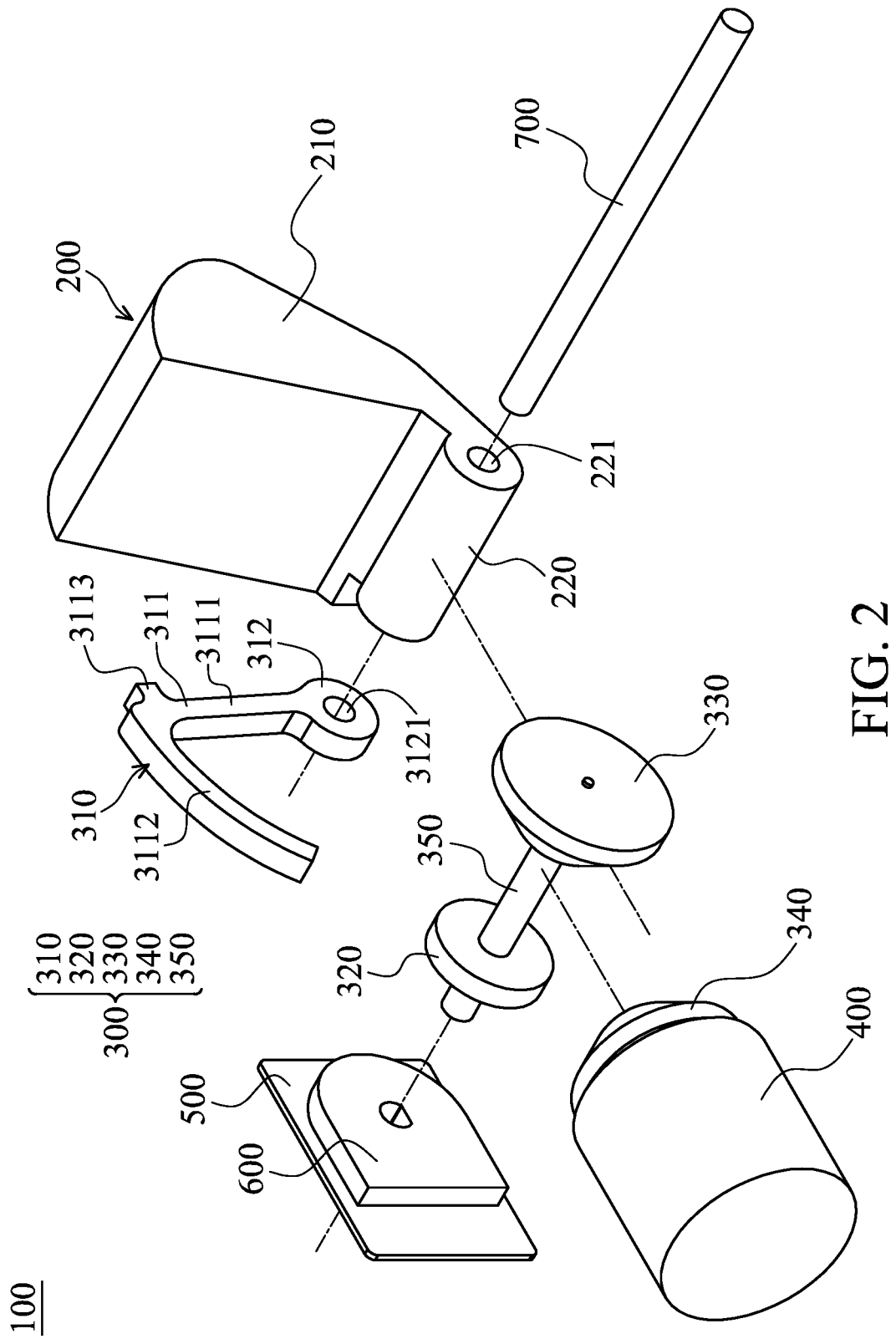
FIG. 2 is an exploded view of the force feedback module.

Please refer to FIG. 1 and FIG. 2 to understand a force feedback module 100. FIG. 1 is a perspective view of the force feedback module 100. FIG. 2 is an exploded view of the force feedback module 100. A handheld controller that includes a button or a trigger may be equipped with the force feedback module 100. Therefore, force feedback may be provided when a user applies force to (e.g. press) the button or the trigger. In this embodiment, the force feedback module 100 includes a trigger element 200, a transmission assembly 300, an actuating element 400, a circuit element 500, a sensing element 600, and a pin 700. However, elements may be added or omitted according to actual needs.

The trigger element 200 may be disposed close to the fingers of the user. The trigger element 200 includes a trigger body 210 and a trigger pivotally connected portion 220. The shape of the trigger body 210 may correspond to the shape of the casing of the button or the trigger. A hole 221 may be formed on the trigger pivotally connected portion 220, so the pin 700 may pass through the trigger pivotally connected portion 220. The trigger element 200 may rotate around the pin 700.

The transmission assembly 300 is disposed between the trigger element 200 and the actuating element 400. The transmission assembly 300 includes a first transmission element 310, a second transmission element 320, a third transmission element 330, a fourth transmission element 340, and a transmission rod 350. In some embodiments, the first transmission element 310 may be a linear gear. In some embodiments, the second transmission element 320, the third transmission element 330, and the fourth transmission element 340 may be a circular gear. For example, the fourth transmission element 340 may be a bevel gear, but it is not limited thereto. For ease of illustration, the teeth portions of the first transmission element 310, the second transmission element 320, the third transmission element 330, and the fourth transmission element 340 are not illustrated. It should be noted that the portions where the first transmission element 310 and the second transmission element 320 are in contact with each other may have meshing teeth portions. In addition, the portions where the third transmission element 330 and the fourth transmission element 340 are in contact with each other may have meshing teeth portions.

The first transmission element 310 includes a transmission body 311 and a transmission pivotally connected portion 312. In some embodiments, the transmission body 311 is substantially L-shaped and includes a straight-line portion 3111 and a curved-line portion 3112. The transmission body 311 may include a protrusion 3113 facing the trigger element 200. A hole 3121 may be formed on the transmission pivotally connected portion 312, so the pin 700 may pass through the transmission pivotally connected portion 312. The hole 3121 of the transmission pivotally connected portion 312 may be aligned with the hole 221 of the trigger pivotally connected portion 220. The first transmission element 310 may rotate around the pin 700.

The second transmission element 320 is in contact with the first transmission element 310. In some embodiments, the second transmission element 320 meshes (or engage) the first transmission element 310. In some embodiments, the second transmission element 320 is connected to the third transmission element 330 via the transmission rod 350. That is, the second transmission element 320 and the third transmission element 330 have the same rotation axis. The second transmission element 320 and the third transmission element 330 may rotate around the transmission rod 350 (i.e. the transmission rod 350 is the rotation axis). The fourth transmission element 340 is in contact with the third transmission element 330. In some embodiments, the fourth transmission element 340 meshes (or engage) the third transmission element 330.

The actuating element 400 may be any elements that can generate a driving force, and the generated driving force may have different amount and directions. For example, the actuating element 400 may generate the driving force by rotation, translation, vibration, and the like. In some embodiments, the actuating element 400 may be a motor. In some embodiments, the actuating element 400 includes a rotation shaft 410 (denoted in FIG. 3). The fourth transmission element 340 may be connected to the actuating element 400 via the rotation shaft 410, and the fourth transmission element 340 may rotate around the rotation shaft 410.

The circuit element 500 is disposed close to the second transmission element 320. In some embodiments, the circuit element 500 may be a circuit board. For example, the circuit element 500 may be a rigid board, a rigid-flex board, and the like, but it is not limited thereto. The sensing element 600 is disposed on the circuit element 500. The sensing element 600 may sense the position of the first transmission element 310 and generate a signal. In some embodiments, the transmission rod 350 is embedded (or engaged) in the sensing element 600, so the sensing element 600 is able to sense the position of the first transmission element 310 via the rotation of the transmission rod 350, but the sensing of the sensing element 600 is not limited thereto. The pin 700 passes through the hole 221 of the trigger pivotally connected portion 220 and the hole 3121 of the transmission pivotally connected portion 312. In some embodiments, the pin 700 is cylindrical-shaped.

Figure 3:
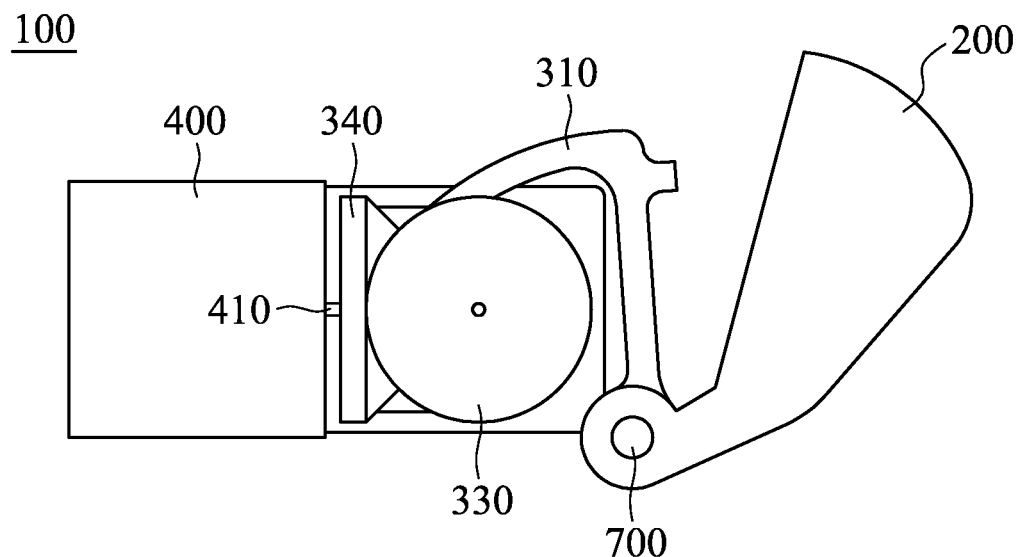
FIG. 3 is a front view of the force feedback module illustrated in FIG. 1.
Figure 4:
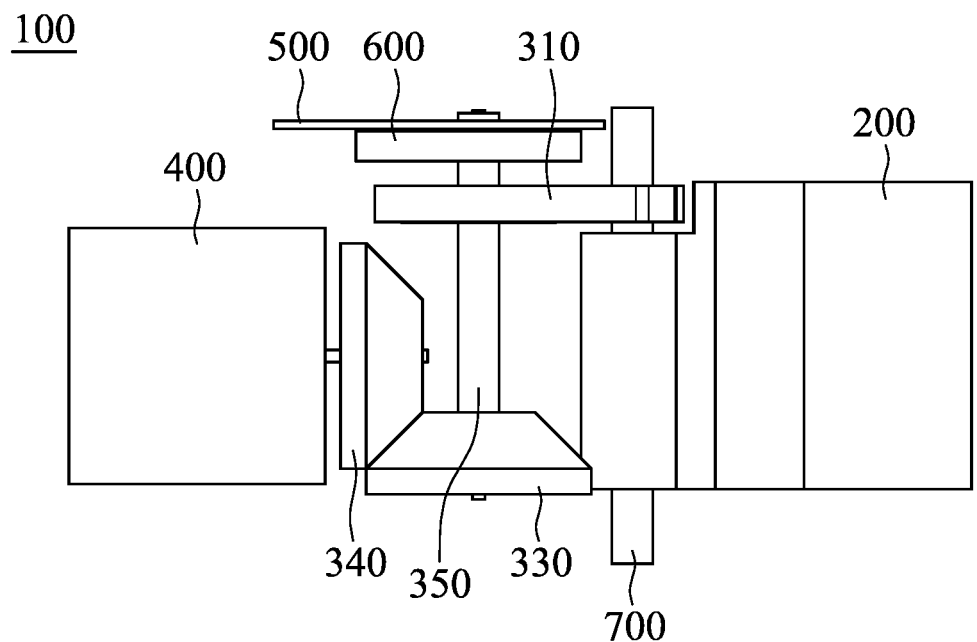
FIG. 4 is a top view of the force feedback module illustrated in FIG. 1.
Figure 5:
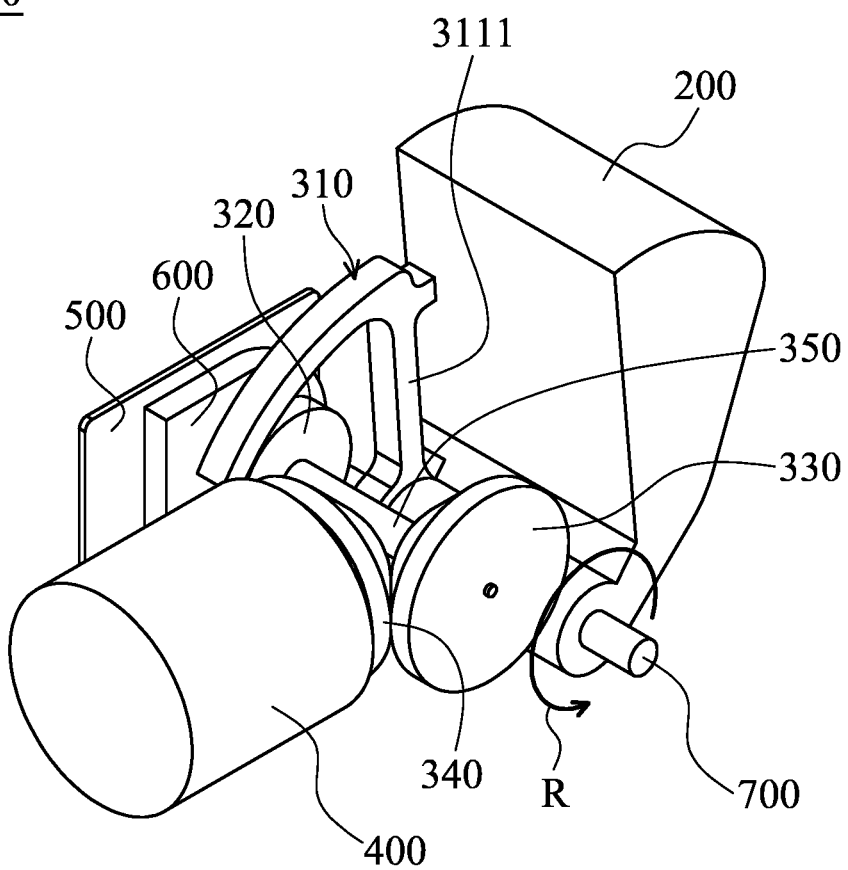
FIG. 5 is a perspective view of the force feedback module, wherein the trigger element is in contact with the first transmission element.
Figure 6:
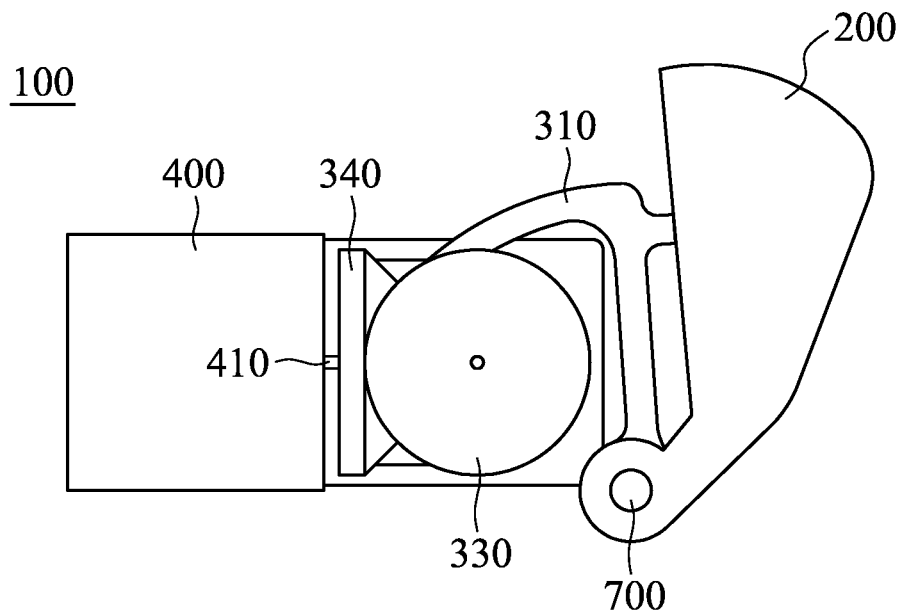
FIG. 6 is a front view of the force feedback module illustrated in FIG. 5.
Figure 7:
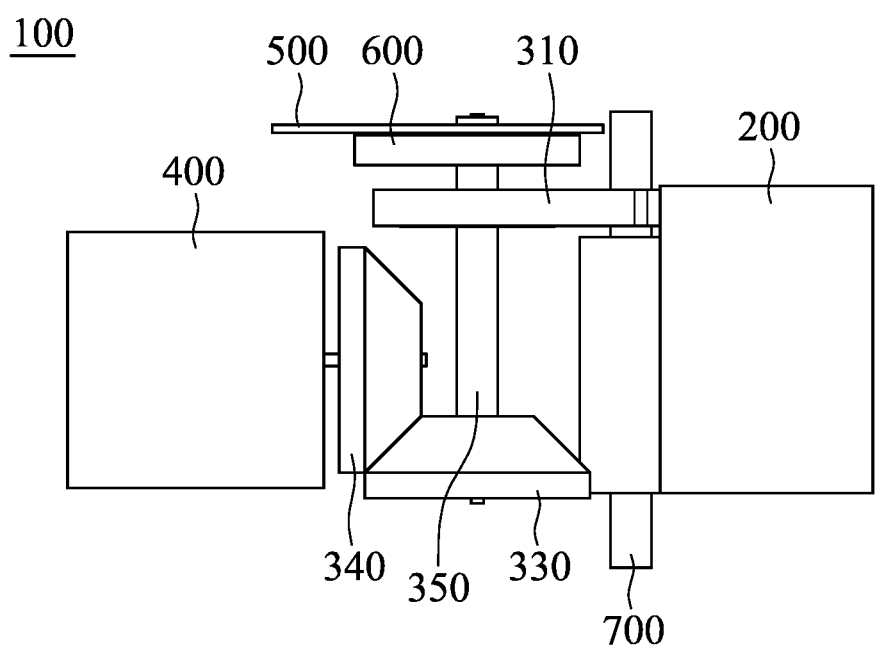
FIG. 7 is a top view of the force feedback module illustrated in FIG. 5.

As described above, the trigger element 200 and the first transmission element 310 are both able to rotate around the pin 700. Please refer to FIG. 1 and FIG. 3 to FIG. 7 to understand the rotation of the trigger element 200. FIG. 3 is a front view of the force feedback module 100 illustrated in FIG. 1. FIG. 4 is a top view of the force feedback module 100 illustrated in FIG. 1. FIG. 5 is a perspective view of the force feedback module 100, wherein the trigger element 200 is in contact with the first transmission element 310. FIG. 6 is a front view of the force feedback module 100 illustrated in FIG. 5. FIG. 7 is a top view of the force feedback module 100 illustrated in FIG. 5.

Users may apply force to the button or the trigger in the handheld controller, making the trigger element 200 rotates around the pin 700 toward the first transmission element 310 until the trigger element 200 is in contact with the first transmission element 310 (for example, the trigger element 200 may be in contact with the protrusion 3113 of the first transmission element 310). In some embodiments, during the period that the trigger element 200 rotates around the pin 700 toward the first transmission element 310 until being in contact with the first transmission element 310, the first transmission element 310 may not rotate.

Figure 8:
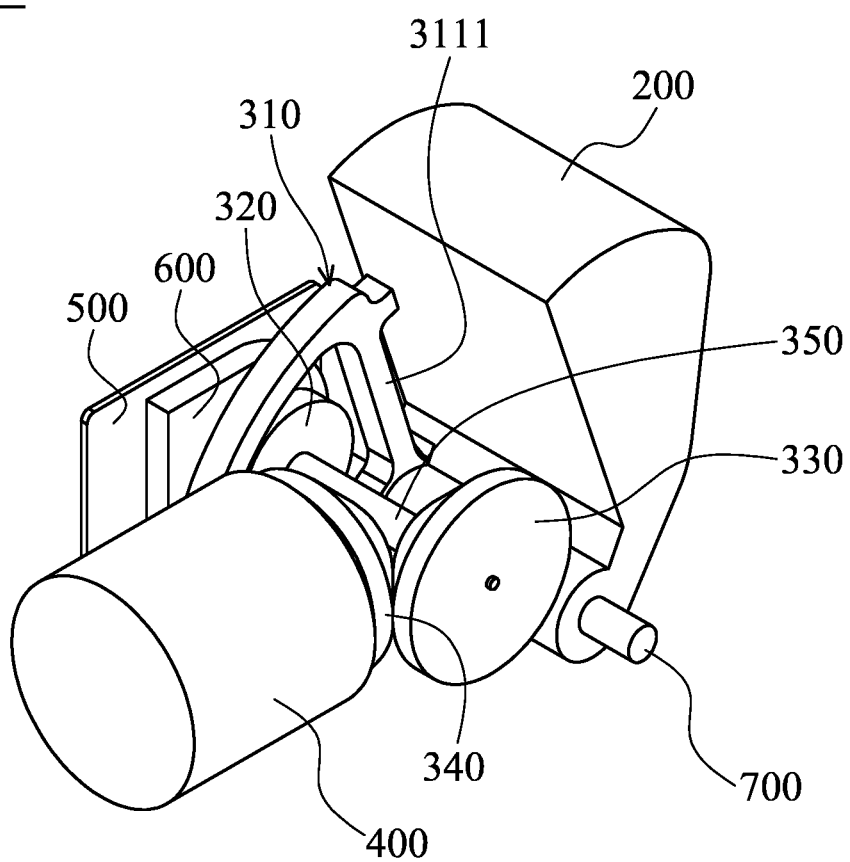
FIG. 8 is a perspective view of the force feedback module, wherein the trigger element and the first transmission element rotate to the limit.
Figure 9:
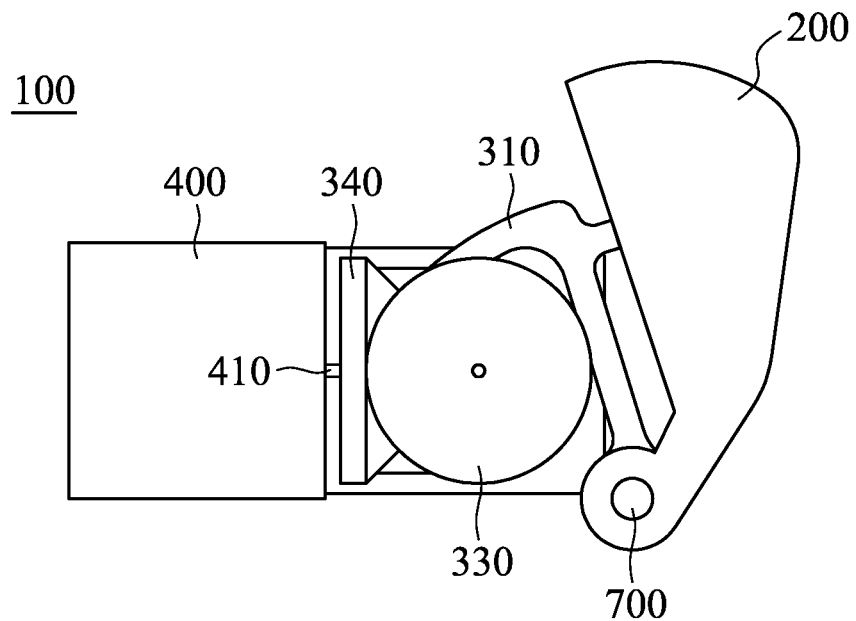
FIG. 9 is a front view of the force feedback module illustrated in FIG. 8.
Figure 10:
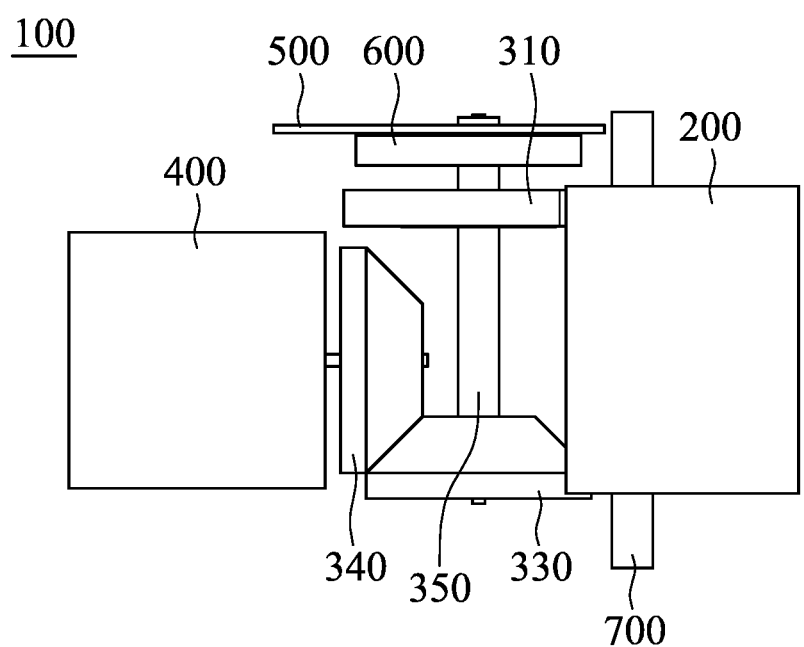
FIG. 10 is a top view of the force feedback module illustrated in FIG. 8.

Next, please refer to FIG. 5 to FIG. 10 to understand the rotation of the first transmission element 310. FIG. 8 is a perspective view of the force feedback module 100, wherein the trigger element 200 and the first transmission element 310 rotate to the limit. FIG. 9 is a front view of the force feedback module 100 illustrated in FIG. 8. FIG. 10 is a top view of the force feedback module 100 illustrated in FIG. 8.

After the trigger element 200 contacts the first transmission element 310 (as illustrated in FIG. 5 to FIG. 7), users may continuously apply force to the button or the trigger in the handheld controller, making the trigger element 200 and the first transmission element 310 rotated around the pin 700 together (direction of rotation is illustrated by the arrow R in FIG. 5) until the trigger element 200 and the first transmission element 310 rotate to the limit (i.e. a specific position) and cannot rotate further (as shown in FIG. 8 to FIG. 10). In some embodiments, when the trigger element 200 and the first transmission element 310 rotate to the limit (i.e. a specific position) and cannot rotate further, the second transmission element 320 contacts the straight-line portion 3111 of the first transmission element 310 so as to stop the rotation of the trigger element 200 and the first transmission element 310, but stopping the rotation of the trigger element 200 and the first transmission element 310 is not limited thereto.

In the embodiments illustrated in FIG. 1, FIG. 3, and FIG. 4, the trigger element 200 and the first transmission element 310 may be referred to as in a non-contact state, and in the embodiments illustrated in FIG. 5 to FIG. 10, the trigger element 200 and the first transmission element 310 may be referred to as in a contact state. In other words, the trigger element 200 and the first transmission element 310 are able to alternate between the non-contact state and the contact state.

When the trigger element 200 and the first transmission element 310 are in the non-contact state, a gap is formed between the trigger element 200 and the first transmission element 310 (such gap may be referred to as "an idle stroke"), so the driving force generated by the actuating element 400 cannot be transferred to the trigger element 200 via the transmission assembly 300. That is, when the trigger element 200 and the first transmission element 310 are in the non-contact state, applying force to the button or the trigger of the handheld controller would not generate force feedback.

When the trigger element 200 and the first transmission element 310 are in the contact state and the actuating element 400 generates the driving force, the actuating element 400 drives the fourth transmission element 340 to rotate around the rotation shaft 410 of the actuating element 400. The fourth transmission element 340 may drive the third transmission element 330 and the second transmission element 320 to rotate with the transmission rod 350 as the rotating shaft. Furthermore, the second transmission element 320 may drive the first transmission element 310 to rotate with the pin 700 as the fulcrum. Therefore, the driving force generated by the actuating element 400 can adjust the position of the first transmission element 310 and then transferred to the trigger element 200. That is, when the trigger element 200 and the first transmission element 310 are in the contact state and the actuating element 400 generates the driving force, the transmission assembly 300 is able to transmit the driving force generated by the actuating element 400 to the trigger element 200 so as to generate force feedback.

Due to the rotation, translation, or vibration of the actuating element 400, users' fingers may experience different feelings, thereby generating immersive force feedback and enhancing user experience in haptic interaction. For example, if the actuating element 400 vibrates at a particular frequency or rotates intermittently, users may feel a sensation similar to firing a machine gun. For example, if the actuating element 400 moves toward the trigger element 200, the trigger may feel heavier to the user.

In some embodiments, the force feedback module 100 further includes a control unit. Based on the signals generated by the sensing element 600, the control unit may control the rotation, translation, or vibration of the actuating element 400 to control the amount and directions of generated driving force. In addition, in some embodiments, based on "the range of the angle of rotation of the trigger element 200", the control unit can define "the progress of applying force" given by a user.

In particular, the angle between where the trigger element 200 does not start to rotate and where the trigger element 200 rotates to the limit may be referred to as "the range of the angle of rotation of the trigger element 200". In some embodiments, the range of the angle of rotation of the trigger element 200 is less than or equal to 80 degrees, such as about 15 degrees, about 20 degrees, about 25 degrees, about 30 degrees, about 35 degrees, about 40 degrees, about 45 degrees, or about 50 degrees, but it is not limited thereto. In addition, when the user does not start to press the trigger element 200, "the progress of applying force" may be referred to as 0%. When the user feels that the press is done (i.e. the trigger element 200 rotates to the limit and cannot rotate further), "the progress of applying force" may be referred to as 100%.

For example, if the range of the angle of rotation of the trigger element 200 is 50 degrees, for every degree the trigger element 200 rotates, the progress of applying force increases by 2%. If the range of the angle of rotation of the trigger element 200 is 25 degrees, for every degree the trigger element 200 rotates, the progress of applying force increases by 4%.

When a user wants to use the force feedback module 100, he can set the range of the angle of rotation of the trigger element 200 and the modes of force feedback in advance, according to different variables, including his hand size, personal preferences, the game he wants to play, etc. For example, if a user wants to simulate pulling the trigger of a gun, the user may set the range of the angle of rotation of the trigger element 200 to about 50 degrees; to have force feedback when the progress of applying force reaches 20%; and to have stronger force feedback when the progress of applying force reaches 100%.

After the setting is completed, the control unit is able to calculate and control the initial position of the first transmission element 310. Using the aforementioned settings, the angle between the trigger element 200 and the initial position of the first transmission element 310 is about 10 degrees. Therefore, when the progress of applying force is between 0% to 20%, no force feedback is generated. In addition, using to the aforementioned settings, the trigger element 200 would contact the first transmission element 310 when rotated 10 degrees, i.e. when the progress of applying force substantially reaches 20%, the sensing element 600 is able to sense that the first transmission element 310 is starting to rotate and generate signals to the control unit, and thus the control unit can control the actuating element 400 to generate a predetermined driving force. Using the aforementioned settings, when the progress of applying force reaches 100%, the control unit is able to control the actuating element 400 to generate a greater force.

The aforementioned settings are merely examples. Users may arbitrarily set the modes of force feedback. For example, a user may decide to have force feedback when starting to press, and the force feedback may increase as the progress of applying force increases. Under such settings, the trigger element 200 is in contact with the first transmission element 310 at the beginning, and the actuating element 400 may generate greater driving force as the trigger element 200 and the first transmission element 310 keep rotating. Alternatively, a user may decide to have force feedback for slow vibration when the progress of applying force reaches 50%, and to have force feedback for fast vibration when the progress of applying force reaches 80%. Under these settings, the vibration frequency of the actuating element 400 may increase. To sum up, the force feedback module 100 may adjust the initial position of the first transmission element 310 and the driving force generated by the actuating element 400.

It should be noted that, after every press is done by the user, the trigger element 200 may return to its original position by some elements that are able to generate elastic force for pulling the trigger element 200 back to its original position. In addition, the actuating element 400 may continuously generate the driving force, and the driving force may be transmitted to the first transmission element 310 via the transmission assembly 300, so the first transmission element 310 may return to its initial positon quickly. Therefore, every time a user applies force to the button or the trigger in the handheld controller, the force feedback module 100 can provide desirable modes of force feedback.

As described above, a force feedback module is provided. The force feedback module may be provided in a handheld controller that includes a button or a trigger. The force feedback module includes a trigger element, an actuating element, and a transmission assembly. The trigger element may be disposed close to the fingers of a user. The actuating element may generate a driving force by rotation, translation, vibration, and the like. The driving force generated by the actuating element may be transmitted to the trigger element via the transmission assembly to provide immersive force feedback, thereby enhancing user experience in haptic interaction. In addition, when a user wants to use the force feedback module, he can set the modes of force feedback in advance, according to different variables, including his hand size, personal preferences, the game he wants to play, etc. For example, different force feedback can be provided based on the progress of applying force. Furthermore, after every press is done by the user, in addition to the trigger element, the transmission assembly may also return to its original position. Therefore, every time a user applies force to the button or the trigger in the handheld controller, the force feedback module can provide desirable modes of force feedback.

The foregoing outlines features of several embodiments so that those skilled in the art may better understand the aspects of this disclosure. Those skilled in the art should appreciate that they may readily use this disclosure as a basis for designing or modifying other processes and structures for carrying out the same purposes and/or achieving the same advantages of the embodiments introduced herein. Those skilled in the art should also realize that such equivalent constructions do not depart from the spirit and scope of this disclosure, and that they may make various changes, substitutions, and alterations herein without departing from the spirit and scope of this disclosure. In addition, the scope of this disclosure is not limited to the specific embodiments described in the specification, and each claim constitutes a separate embodiment, and the combination of various claims and embodiments are within the scope of the disclosure.

What is claimed is:

1. A force feedback module comprising:
   a trigger element;
   an actuating element; and
   a transmission assembly disposed between the trigger element and the actuating element,
   wherein the transmission assembly comprises a first transmission element, and the first transmission element and the trigger element change between a contact state and a non-contact state,
   wherein when the first transmission element and the trigger element are in the contact state, a driving force generated by the actuating element is transmitted to the trigger element via the transmission assembly to generate force feedback, and the first transmission element and the trigger element are configured to rotate about a common rotation axis until the first transmission element and the trigger element reach a rotational limit.

2. The force feedback module as claimed in claim 1, wherein the first transmission element comprises a protrusion facing the trigger element.

3. The force feedback module as claimed in claim 1, wherein the transmission assembly further comprises a second transmission element that meshes with the first transmission element.

4. The force feedback module as claimed in claim 3, wherein the transmission assembly further comprises a third transmission element and a transmission rod, and the second transmission element is connected to the third transmission element via the transmission rod.

5. The force feedback module as claimed in claim 4, wherein the transmission assembly further comprises a fourth transmission element that meshes with the third transmission element.

6. The force feedback module as claimed in claim 5, wherein the first transmission element comprises a linear gear, and the second transmission element, the third transmission element, and the fourth transmission element comprise a circular gear.

7. The force feedback module as claimed in claim 6, further comprising a pin, wherein the first transmission element comprises a transmission pivotally connected portion, and the pin passes through the transmission pivotally connected portion, the actuating element comprises a rotation shaft, the fourth transmission element is connected to the actuating element via the rotation shaft, when the first transmission element and the trigger element are in the contact state and the actuating element generates the driving force, the actuating element drives the fourth transmission element to rotate around the rotation shaft of the actuating element, the fourth transmission element drives the third transmission element and the second transmission element to rotate around the transmission rod, and the second transmission element drives the first transmission element to rotate around the pin.

8. The force feedback module as claimed in claim 1, further comprising a pin, wherein the trigger element comprises a trigger pivotally connected portion, the pin passes through the trigger pivotally connected portion, and when a force is applied to the trigger element, the trigger element rotates around the pin.

9. The force feedback module as claimed in claim 1, further comprising a sensing element sensing a position of the first transmission element and generates a signal.

10. The force feedback module as claimed in claim 9, further comprising a control unit controlling the amount and the direction of the driving force generated by the actuating element based on the signal.

11. The force feedback module as claimed in claim 9, wherein the transmission assembly further comprises a transmission rod embedded in the sensing element.

12. The force feedback module as claimed in claim 1, wherein the actuating element generates the driving force by rotation, translation, or vibration.

13. The force feedback module as claimed in claim 1, wherein the actuating element is a motor.

14. The force feedback module as claimed in claim 1, wherein the first transmission element comprises a transmission body that is L-shaped with a straight-line portion and a curved-line portion.

15. The force feedback module as claimed in claim 14, further comprising a pin around which the trigger element and the first transmission element rotate, wherein the transmission assembly further comprises a second transmission element that meshes with the first transmission element, and when the trigger element and the first transmission element reach the rotational limit and cannot rotate further, the second transmission element contacts the straight-line portion.

16. The force feedback module as claimed in claim 1, wherein a progress of applying force between 0% to 100% is defined by rotation range of the trigger element.

17. The force feedback module as claimed in claim 1, wherein when the first transmission element and the trigger element are in the non-contact state, a gap is formed between the first transmission element and the trigger element.

\* \* \* \* \*